United States Patent
Wetter et al.

(10) Patent No.: US 7,373,070 B2
(45) Date of Patent: May 13, 2008

(54) OPTICAL FIBER COMPONENT PACKAGE FOR HIGH POWER DISSIPATION

(75) Inventors: Alexandre Wetter, Montreal (CA); François Seguin, Beaconsfield (CA); Lilian Martineau, Grenoble (FR); Mathieu Faucher, Montreal (CA)

(73) Assignee: ITF Laboratories Inc., Montreal, Quebec (CA)

( * ) Notice: Subject to any disclaimer, the term of this patent is extended or adjusted under 35 U.S.C. 154(b) by 0 days.

(21) Appl. No.: 11/625,571

(22) Filed: Jan. 22, 2007

(65) Prior Publication Data

US 2007/0206909 A1    Sep. 6, 2007

(30) Foreign Application Priority Data

Jan. 23, 2006    (CA)    ................................ 2533674

(51) Int. Cl.
    *G02B 6/00*    (2006.01)
(52) U.S. Cl. .................................................... 385/134
(58) Field of Classification Search ................ 385/134, 385/37, 94
    See application file for complete search history.

(56) References Cited

U.S. PATENT DOCUMENTS

| | | | | |
|---|---|---|---|---|
| 5,987,200 A | * | 11/1999 | Fleming et al. | ................ 385/37 |
| 6,101,301 A | * | 8/2000 | Engelberth et al. | ........... 385/37 |
| 6,621,957 B1 | * | 9/2003 | Sullivan et al. | ................ 385/37 |
| 6,974,266 B2 | * | 12/2005 | Seguin et al. | .................. 385/94 |

\* cited by examiner

*Primary Examiner*—Quyen P Leung
(74) *Attorney, Agent, or Firm*—Robert Brouillette; Brouillette & Partners LLP (57) ABSTRACT

A package for an optical fiber device is disclosed. It has a high thermal conductivity packaging substrate surrounding the optical fiber device and has adhesive bonds at each end anchoring the optical fiber device to the substrate. The adhesive bonds are made of a material that has high transparency in damp heat as well as a high glass transition temperature and is capable of withstanding temperatures of over 100° C. The packaging substrate has a high absorption capacity and a CTE in relation to the CTE of the adhesive bond, such as to compensate for any variation in the adhesive bond due to temperature variations. This allows to limit mechanical stress in the optical fiber device within the package.

29 Claims, 4 Drawing Sheets

Fig. 8

OPTICAL FIBER COMPONENT PACKAGE FOR HIGH POWER DISSIPATION

FIELD OF THE INVENTION

This invention relates to an optical fiber component package. More particularly, it relates to a package for optical fiber devices that are capable of operating at high power levels.

BACKGROUND OF THE INVENTION

Fiber lasers and amplifiers are being used in a growing number of applications. As these mature in the commercial, deployment, an intense focus is being put on their reliability and that of their components. With the current progress in this field, reliability demonstrations must be made at increasingly higher power levels. Optical fiber reliability, connector reliability and susceptibility of optical fiber coatings to optical power damage have been studied for a number of years. Power levels for most applications have however been limited to the range of a few tens of Watts.

In U.S. Pat. No. 4,678,273 a high power optical fiber with improved covering is described. In U.S. Patent Application Publication No. 2004/0175086 a fiber with a multilayer cladding arrangement is proposed to provide means of extracting energy from the cladding. These two inventions specifically address the issue of power handling of the optical fiber and its coating, but do not provide a solution for the component related power handling issues. In U.S. Pat. Nos. 5,291,570 and 5,946,437, there are described two variants of high power fiber connectors with means to prevent intense radiation, not coupled in the optical fiber, from damaging the fiber jacket. These two patents propose no solution to the specific problem of fiber component packaging and describe only a solution applicable to the ends of fibers where light is coupled from a source to the fiber input. In U.S. Pat. No. 6,865,316 B1, a cladding mode stripper is described for use in dissipating unwanted optical power coupled to the fiber cladding in a laser-to-fiber coupling arrangement. This patent is another example of an invention addressing excess light at the launch point into a fiber. In U.S. Patent Application Publication No. 2003/0103724, a fiber termination is proposed for lessening negative effects associated with launching high power signals from a single mode optical fiber. This is the reverseproblem from optical launch into the fiber and does not cover fiber component related high power issues.

In U.S. Pat. No. 6,860,651 B2, a fiber optic component packaging invention is presented where various configurations are claimed to optically extract lost light to displace heat generation away from the optical device. The principal claim of this invention is to use a fiber to capture and divert optical power loss into a terminated end, where more efficient heat dissipation means can be applied. This solution is better suited for a certain class of components where the lost signal is available for coupling to a fiber, for example in micro-optic thin film components where optical loss is available in the form of a well defined reflected portion of the input beam. This is not generally the case in fiber optic components. In general optical loss will be spurious in nature and the corresponding optical beam characteristics will be ill-defined, which makes the use of an optical fiber based loss extraction impractical.

All-fiber components, such as tapered fused bundle ('11'13) couplers, pump strippers, splices, mode field adaptors and Bragg gratings, allow monolithic integration of fiber laser and amplifier devices for deployment in the field. Characterized by intrinsically low loss transmission, they are well suited to handle signal and pump light, which are likely to reach the kW level in the near future. However, little progress has been made or improvements proposed for increasing the power handling capabilities of these components. In general, several package features are dictated by the requirements to robustly enclose the component in a protective enclosure, decouple the optical device from loads applied to the lead fibers and maintain performance in an uncontrolled environment, where temperature and humidity variations can lead to aging or thermally induced stresses. These requirements must be met while reducing the package sensitivity to high optical power levels, which creates a need for a novel packaging solution.

OBJECTS AND SUMMARY OF THE INVENTION

It is an object of the present invention to provide an optical fiber component package for optical fiber devices operating at high power levels.

A further object of the present invention is to provide an optical fiber component package that will avoid damage to the optical fiber device due to mechanical stresses.

Other objects and advantages of the invention will be apparent from the following description thereof.

The most meaningful benchmark of reliability under high optical power must involve the capability of the device to handle optical power loss, rather than transmitted power. This approach provides a more accurate estimate of feasible power levels and allows increased power handling by addressing thermal management and optical loss reduction issues concurrently. The origin of optical loss and its impact on package temperature rise must be studied to produce a component package optimized for heat dissipation. This approach must be applied to all of the principal components of fiber lasers.

The requirements for providing a robust decoupling from external loads dictates the use of rigid anchoring bonds, causing the optical structure to experience strain induced by mismatches in coefficient of thermal expansion between the packaging substrate material and the optical fibers. Configuring the package geometry and choosing the properties for its parts are therefore important factors in maintaining a reliable operation.

In a typical TFB structure comprising, for example, six multimode pump fibers arrayed in a closed pack hexagonal arrangement around a central signal carrying fiber, this bundle of fibers is fused and elongated to match a target fiber, which has a signal-carrying core surrounded by a fluoroacrylate outer cladding, creating a guiding structure for the pump light. As the pump fibers are tapered, the pump signal undergoes a numerical aperture transformation that follows the preservation of brightness relationship $NA_1 D_1 = NA_2 D_2$. At the fusion splice, several loss components are generated including NA and area mismatch of pump light and modal mismatch of the signal. Table 1 below summarizes the main sources of optical loss that can potentially generate heat loads. The loss can follow a complex path depending on its nature and location. For example, an. adhesive bonded dual-core fiber can be considered a six-layer waveguide, leading to many potential reflections and refractions. The loss and absorption paths determine the dissipation limits of the device. Improving heat load distribution, results in a lower maximum temperature for the same power loss.

TABLE 1

Principal sources of optical loss in a TFB structure carrying both pump and signal

| | Type | Description | Loss path |
|---|---|---|---|
| 1 | NA transformation | Light NA exceeds waveguiding capacity 1- Structure transforms signal NA 2- Structure NA suddenly changes | Refraction/absorption in cladding material |
| 2 | Scattering loss at splice | Cladding light loss due to area mismatch - DCF cladding/bundle | Radiation in air |
| | | Cladding light loss due to lateral misalignment - DCF cladding/bundle | Radiation in air |
| | | Cladding light loss due to angular misalignment - DCF cladding/bundle | Radiation in air and guidance by glass-air interface |
| | | Core light modal mismatch | Coupling to cladding modes; degradation of modal content |
| 3 | Microbending | Microbend on core guided signal | Coupling to cladding guided modes |
| | | Microbend on cladding guided pump | Refraction at cladding interface |
| 4 | Macrobending | Macrobend on core guided signal | Coupling to cladding guided modes |
| | | Macrobend on cladding guided pump | Refraction at cladding interface |
| 5 | Absorptive Defects | Contaminants, aged organics microcracks, polymer delamination | Absorption/scattering by defects |

Loss is a function of component properties, and also of the specific signal quality presented to the input fibers. When considering pump light for example, a realistic pump loss can be predicted using a simple integral (equation 1 below):

$$IL_{Pump} = \int_0^\infty g(NA)f(NA)d(NA) \quad (1)$$

Where $IL_{Pump}$ is insertion loss for the pump, g(NA) represents the pump pigtail far field intensity distribution and f(NA), the NA-dependent loss function of the TFB. Various NA altering phenomenon also come into play to change the exact farfield distribution of multimode signals such as mode scrambling due to coiling prior to launch in the TFB.

The same concerns apply to the signal-carrying fiber, especially in the case of large mode area fibers, where low numerical apertures and large V numbers make splicing an important source of modal degradation. Increased LP01 loss not only generates heat loads, but also can result in a non-thermally driven failure mode. As more interfering modes are excited, gain instabilities can lead to the generation of intense pulses that will exceed the material breakdown threshold of glass, resulting in destruction of the core, typically in the regions of smallest mode diameter. It is not the purpose of a packaging solution to solve this issue, however, the coupler package should preserve modal quality during assembly and subsequently in all conditions of use, including laser power cycling and ambient temperature cycling.

The elements most susceptible to failure from heat loads are the TFB anchoring bonds. Their temperature profile can be estimated analytically by making a few simplifications. Thus, the adhesive may be represented as a truncated cylinder with finite thermal resistance in contact with a heatsink. Heat flow may be represented by longitudinal and radial terms. The adhesive provides the dissipation path as well as the source of heat itself, through signal absorption. Presented here as a function of the longitudinal dimension only, the model neglects the radial components of light absorption and temperature gradients. The bondline radius does, however, influencethermal conductivity and is taken into consideration. Only the dominant conduction term can be considered, which yields the simplified equilibrium expressed in equation 2 below:

$$\phi(x)+\phi(x+dx)-h(x)+P_i(x)=0 \quad (2)$$

Where cp(x) is the conducted heat flux on each side of the disc of elemental length dx, h(x) the flux conducted to the heat sink in the radial direction and Pi(x) is the optical power absorbed by incremental length dx. If we assign k as the adhesive thermal conductivity in the longitudinal direction, A the area of the disc, h, a factor that combines material and geometrical properties of conduction in the radial direction, B the perimeter of the cylinder, a, the attenuation coefficient of the adhesive and finally P0, the input optical power, we can express this equilibrium as a differential equation 3 shown below:

$$\frac{\partial^2 \Delta T(x)}{\partial^2 x} - \frac{hB}{kA}\Delta T(x) + \frac{P_0}{kA}\alpha e^{-\alpha x} = 0 \quad (3)$$

Applying the proper limit conditions to equation 3 yields the temperature rise profile in the adhesive OT(x) (equation 4 below):

$$\Delta T(x) = \beta \left[ ch(\lambda x) - sh(\lambda x)\left[\frac{ch(\lambda L) - e^{-\alpha L}}{sh(\lambda L)}\right] - e^{-\alpha x}\right] \quad (4)$$

Where L is the adhesive bond length, $$\beta = \frac{P_0 \alpha}{kA(\alpha^2 - \lambda^2)} \text{ and } \lambda^2 = \frac{2h}{kr}$$

Equation 4 predicts a longitudinal profile where a peak is present some distance away from the edges of the bondline. It is important to locate this point in order to properly establish the maximum temperature reached during operation. In order to corroborate the model, samples were instrumented to provide temperature-mapping capability inside a fully enclosed package. Capillary tubing transecting the adhesive bond in the radial and longitudinal axis were introduced to allow high reflectivity Bragg gratings to be positioned for profiling. To produce a well-controlled optical loss function, a length of pump fiber was stripped and etched in hydrofluoric acid to expose its core to mode stripping from the adhesive. A match was shown between the fitted theoretical profile and the temperature reading from the Bragg. In the radial profile, most heat is generated close to the fiber, probably because the refracted signal has a strong forward directionality. This measurement also confirms that the sidewalls of the package are indeed acting as heatsinks, the distribution matching closely the package sidewall diameter of 3 mm. This analysis indicates that the best strategy to decrease temperature elevation in the package is to control and preferably to minimize the length and diameter of the adhesive, select an adhesive with good transparency and make it contact a packaging material with good thermal conductivity. Also, the packaging material should be such as to compensate for any variation of the adhesive bond at each end of the package, due to temperature variation, so as to prevent damage to the optical device by mechanical stresses that may otherwise be produced.

In essence, the present invention provides a package for an optical fiber device capable of carrying a high power signal which comprises:

(a) a thermally conductive packaging substrate surrounding said optical fiber device and having an entry port through which one end of the optical fiber device enters the package, and an exit port through which another end of the optical fiber device exits the package;

(b) a rigid transparent adhesive bond at the entry port and at the exit port anchoring each end of the optical fiber device to the packaging substrate, said adhesive bond being made of a material having a preselected coefficient of thermal expansion (CTE); and (c) said packaging substrate is made of a material that has a CTE in relation to the CTE of the adhesive bond, such as to compensate for any variation of said adhesive bond at each end of the optical fiber device due to temperature variation, thereby limiting 10 mechanical stress in the optical fiber device within the package. In other words, the package effective CTE should be close to that of silica, namely $5 \times 10^{-7}/°$ C. In this manner, it was found that tension variations in the packaged component can be kept below 10 gf for a 0-70° C. temperature excursion, which is a satisfactory level.

The optical fiber devices or components that may be packaged in accordance with the present invention include all devices capable of carrying a high power signal, such as, for example, a coupler that combines or separates a plurality of fibers; one such coupler is disclosed in U.S. Patent Application Publication No. 2005/0094952 which belongs to the present applicant. Other suitable devices may constitute connections between two fibers that. may be similar, forming a, splice, or different, forming a mode field adaptor. Also, a pump stripper, namely a device to strip left over power from the cladding of the fiber (cladding light stripper) may be so packaged, as well as Bragg grating devices.

The packaging substrate should preferably have a high thermal conductivity and an absorption capacity such as to absorb essentially all optical loss emanating from the optical fiber device when it is in operation. It may consist of metal or alloy (e.g. CuW or CuMo), or a metal composite (e.g. AlSi), or an advanced composite material (pyrolated graphite), or a ceramic (e.g. AlN), or it can be a combination of two materials in a bi-material arrangement (e.g. Invar or Kovar with inserts of Cu, Ag or Al), or a combination of the above with a highly conductive layer (e.g. electroplated, hot dipped, thin film or foil). Normally, the thermal conductivity should be at least 100 w/mk (watts/meter-kelvin), and preferably it should be higher than 130 w/mk. Normally, the packaging is opaque because this allows the spurious optical signal to be directly absorbed and dissipated, and thus offers an efficient heat extraction and protection against exposure to damaging optical power.

The adhesive bond should be transparent in the wavelength band of the signals that will be transmitted in order to minimize absorption which is the main source of heat. It should preferably have high transparency that would exceed 80% transmission per 1 mm thickness. It should also be capable of withstanding temperatures of over 100° C. and preferably have a service temperature limit of over 130° C. It should also have a high glass transition temperature (Tg), preferably above 85° C. Once it is cured, it must be rigid so as to protect the glass component from load applied externally to the fibers. Moreover, the adhesive should preferably have the same spectral absorption between 800-1600 nm before and after aging (500 hours in an 85° C./85% relative humidity environment). Several such materials have been reviewed. One is, for instance, described in U.S. Patent Application Publication No. 2005/0282996 A1. After testing a number of them, the best example of such adhesive bond was found to be AC L2007 from Addison Clear Wave, which is a UV curable bispol A epoxy acrylate based material. It is characterized by high hardness, high optical transparency, good adhesion to glass and is presently used in the manufacturing of molded plastic lenses.

The packaging substrate material CTE and the-bond material CTE are chosen to produce an effective CTE close to that of silica in order to limit mechanical stress in Tcycling. In a preferred embodiment, the packaging substrate consists of C11 produced by Osprey which is a 50%/50% wt. AlSi metal alloy with a CTE of 11 ppm/° C. in combination with an adhesive bond consisting of AC L2007 having a CTE>30 ppm/° C. This preferred choice is related to the substrate geometry, in particular the length between anchoring bonds (40 mm) and the diameter of the bond (3 mm); with a different geometry, different materials may be selected. It should also be noted that the CTEs of the materials should preferably be in an arrangement such that:

CTE fiber device<CTE packaging substrate<CTE adhesive bond in order to produce an effective CTE of the package close to the CTE of silica.

The surface of the inner walls of the packaging substrate may be treated to minimize reflections and maximize effective dissipative power of the package. This can be done by abrasion, oxidation or thin film coating or a combination thereof. The finish of the outside surfaces is preferably designed to maximize thermal conductivity. The package produced is preferably flat and rectangular to allow efficient thermal contact when mounting to a flat surface; Also, grooved channels on each side of the package wall are normally provided to allow clamping down with a variety of fasteners and a precise positioning of the component into a complete assembly, providing means to finely adjust its position with respect to other components in the assembly. This also allows CTE mismatches between package and mounting surface to be resolved through pistonning. Finally, strain relief shapes may be machined into the ends of the channels to avoid the use of more conventional elastomeric boots, which may be susceptible to degradation.

DETAILED DESCRIPTION OF THE INVENTION

Preferred embodiments of the invention will now be described with reference to the appended drawings.

Figure 1:
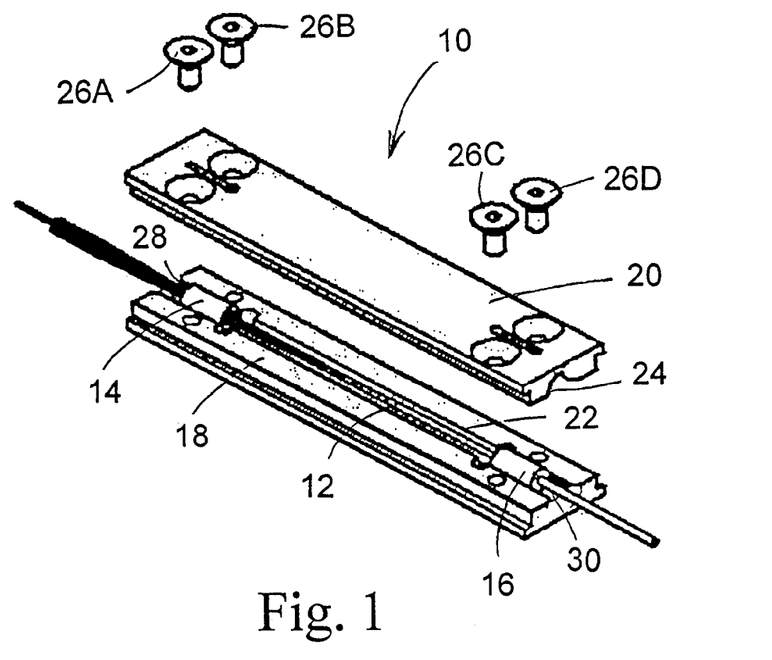
FIG. 1 is a perspective view of the package for an optical fiber device in accordance with the present invention in which the upper portion of the packaging substrate is shown elevated from the lower portion.

FIG. 1 illustrates a preferred design of the package 10 for an optical fiber device 12 packaged in accordance with the present invention. The optical fiber device 12 in this embodiment is a tapered fused bundle (TFB) coupler used to combine signal and pump power, which is illustrated in greater detail in FIG. 2, although it may be any device capable of carrying a high power signal. At each end, the TFB is anchored by means of an adhesive bond 14 and 16 respectively to a packaging substrate consisting of lower and upper sections 18 and 20 respectively. Each section is provided with a grooved channel 22 and 24 respectively in which the device 12 is packaged when the two sections are fastened to one another, for example by means of screws 26A, 26B, 26C and 26D. Strain relief shapes 28, 30 are provided at each end of the device 12 applied to the ends of channel 22 and similarly to the ends of channel 24. Such strain relief shapes can take the form of rounded chamfers and are designed to match the natural elastic deformation of the fibers when submitted to a lateral pull to avoid discontinuity of the first order derivative and preferentially also discontinuity of the second order derivatives of the bent fibers path.

Figure 2:
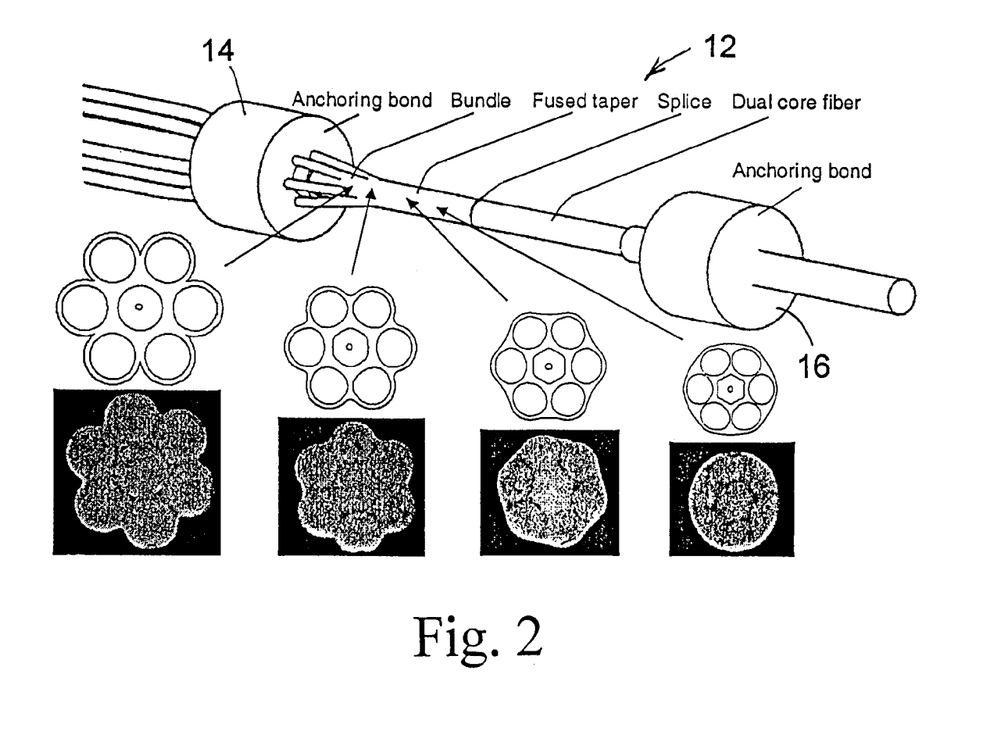
FIG. 2 shows a typical TFB structure of the optical fiber device that may be packaged within the package shown in FIG. 1.

As already indicated above, in this embodiment, the optical fiber component or device 12 that is packaged as shown in FIG. 1 is a TFB coupler as illustrated in FIG. 2 which shows the bundle, the fused taper, the splice and the dual core fiber between the two anchoring bonds 14 and 16. It also shows the cross sectional views of the bundle at different stages until it has the same diameter as the DCF. Also, photographic views of the cross-sections at these stages are shown for illustration purposes.

Figure 3A:
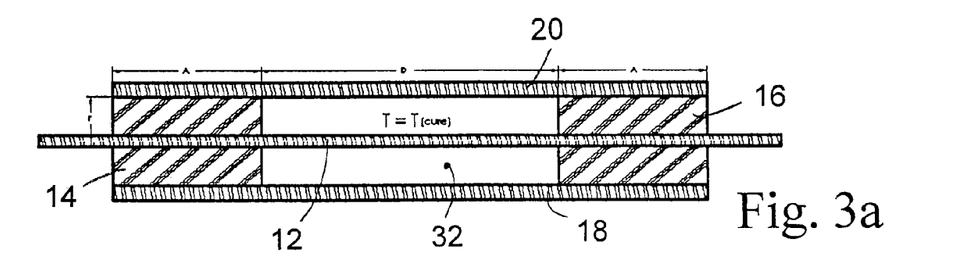
FIGS. 3a, 3b and 3c show a cross-sectional side view of a package in accordance with the present invention at different operating temperatures.
Figure 3B:
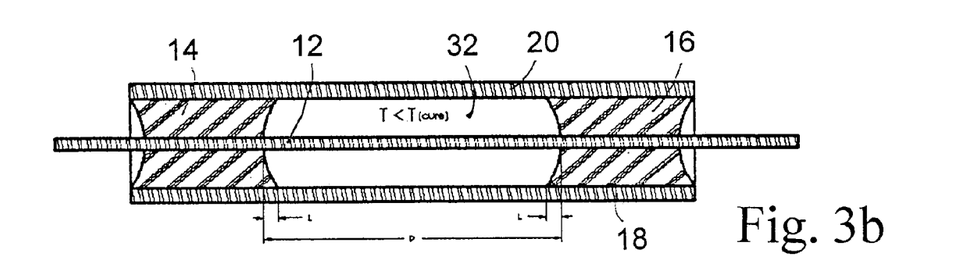
Figure 3C:
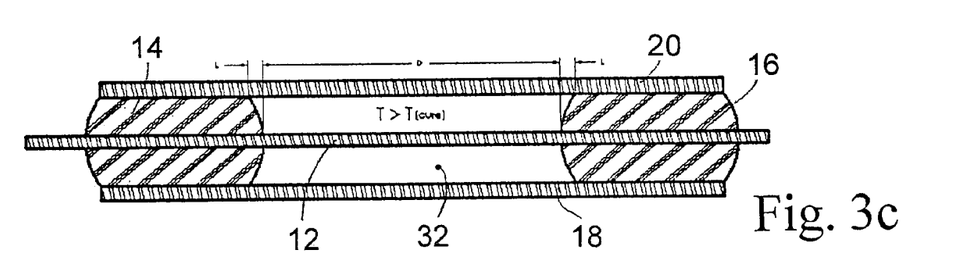

FIG. 3a to 3c show a graphic representation of the arrangement of the adhesive bonds 14 and 16 between the two sides or sections of the packaging substrate 18 and 20 respectively. The protected fiber optic device 12 is located in the space 32 between the two adhesive bonds 14 and 16 in which the ends of this device are anchored. Therefore, the so enclosed device 12 protected by the packaging substrate 18 and 20 has the length D and the adhesive bonds 14 and 16 at each end have each the length A. If the operating temperature T of the device corresponds to the curing temperature T(cure) of the adhesive, then the device will remain in proper unstressed condition as shown in FIG. 3a. However, if the temperature T becomes lower than T(cure), the adhesive bonds will shrink as shown in FIG. 3b, due to the fact that the CTE of the adhesive is greater than that of the package material. This will result in a retraction of the bond surface. In order to maintain the same length D in the middle of the space 32, it is necessary that the two halves 18 and 20 of the substrate also shrink in length to compensate for the shrinkage of the adhesive bond at each end, thereby allowing length D to remain the same and preventing longitudinal stress to the device by undue extension thereof.

On the other hand, if the temperature T becomes higher than T(cure), due to ambient variation or due to the extra heat generated by optical losses from the device, then the adhesive bonds will expand, and it is necessary that the sides 18 and 20 of the substrate should then stretch to increase their lengths correspondingly, and thereby compensate for the expansion, thus maintaining the length D within the space 32 as shown in FIG. 3c.

Figure 4:
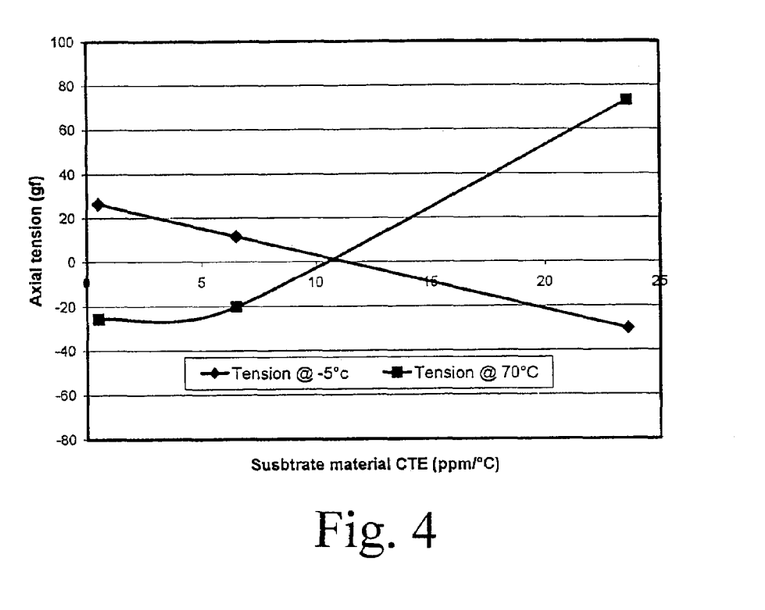
FIG. 4 is a graph showing the relationship between tension and package material CTE.

This compensation between the variation in volume of the adhesive and variation in length of the substrate is done by proper selection of their materials so that the CTE of the substrate material and the CTE of the adhesive bond material would lead to a resulting CTE as close)as possible to that of silica within the operating temperature range, thereby limiting mechanical stress of the device in T-cycling. This can be illustrated by the equation 5 when referring to FIGS. 3a to 3c. The function f(ΔV) linking length variation L to the volume differential ΔV is determined by the specific geometry of the bond.

$$D \cdot \alpha_s \Delta T - 2L = 0, \text{ where } L = f(\Delta V) \text{ and } \Delta V = 3(\alpha_a - \alpha_s) \Delta T \cdot V \quad (5)$$

where $\alpha_s$: thermal expansion coefficient of the substrate
$\alpha_a$: thermal expansion coefficient of the adhesive
V: volume of adhesive FIG. 4 shows how temperature excursion in cycling is affected by substrate material CTE. The adhesive bond is made from the same adhesive (Addison Clearwave ACL2007) with a bond geometry of 3 mm diameter, 8 mm length spaced 40 mm apart. From this figure, the choice of the ideal substrate material CTE for this geometry is 1 lppml° C. A material with this CTE and high thermal conductivity is the metal alloy of aluminium and silicon in a ratio of 50%150% commercially available from Osprey alloys under the brand name C11. It is clear that variations in geometry can give rise to a different optimum, which can lead to selecting a different material satisfying both CTE and high thermal conductivity requirements. By varying the ratio of Al and Si for example, the CTE can be tailored without sacrificing thermal conductivity. Other classes of material also offer flexibility in this design such as carbon matrix composites, thermal pyrolithic graphite, metal matrix graphite composites (GrCu), metal alloys such as AlSiC, CuW, CuMo, and high thermal conductivity ceramic (AlN).

Figure 5:
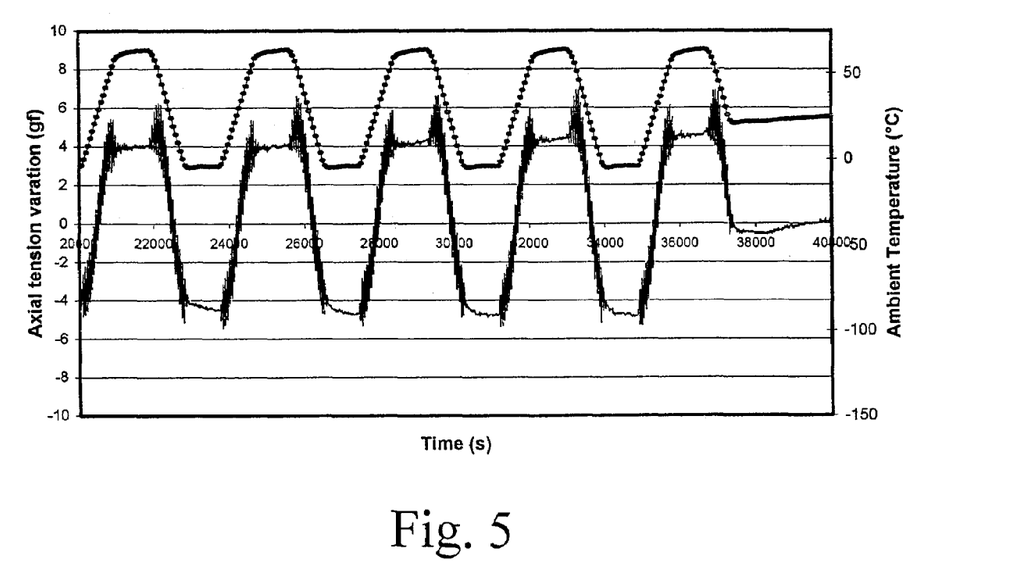
FIG. 5 is a graph showing the dependency of axial tension imparted on a TFB structure under temperature cycling for a given adhesive bond and substrate geometry, and a given adhesive CTE.

FIG. 5 shows axial tension variation on a TFB during temperature cycling using AlSi substrate. The total tension excursion is under 10 gf. The upper curve in this graph represents ambient temperature variation. The two variations follow a similar pattern.

Figures 6A, 6B:
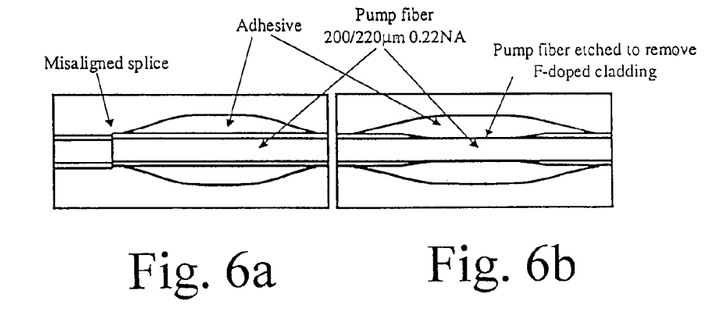
FIGS. 6a and 6b show side view representations of test vehicles used to produce controlled optical losses to test the effectiveness of the package in accordance with the present invention.

To test the package of the present invention while producing a well-controlled optical loss function, test vehicles were made such as illustrated in FIGS. 6a and 6b. Thus, as shown in FIG. 6a, a misaligned splice was formed in a pump fiber 200/220' cm with 0.22 NA while as shown in FIG. 6b, a length of the same pump fiber was stripped of its cladding and etched in hydrofluoric acid to expose its core to mode stripping from the adhesive. These test samples were packaged in a C11 package with sandblasted internal sidewalls. The package performance was concurrently evaluated using a real TFB device in which six 200/220 μm 0.22 NA fibers are bundled around a 6/125 pm 0.14 NA signal fiber and connected to a 20/400 p.m 0.06/0.46 NA dual core fiber. In all cases, the adhesive used was AC L2007. A Bragg grating is co-packaged in the bonds for temperature profiling. In the forward direction, light from six pump sources is used to inject up to 110 W into the pump legs of the TFB, generating up to 2 W of loss. In the reverse direction, a second, identical TFB connected in the same way is used to feed the output DCF fiber to simulate left over pump from a gain fiber. From a total of 77 W injected in this second configuration, 15 W is lost in the package. In both cases, the samples were clamped to the surface of a 100 mm square aluminum block bolted to a stainless steel optical table. The results are presented in FIG. 7.

Figure 7:
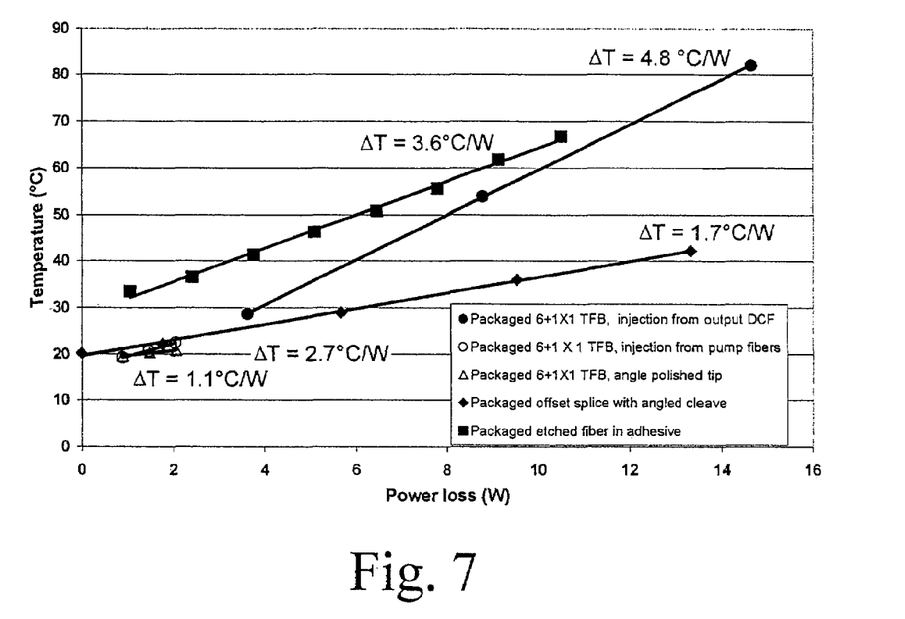
FIG. 7 is a graph showing temperature at the hottest point vs. optical power loss for test samples packaged in accordance with the present invention.

In the forward propagation case, a slope of 2.7° C./W is measured when a straight cleave is applied to the output fiber. Given the very low TFB loss, the fresnel reflection from the fiber endface re-injects a significant amount of light in the backward direction. To demonstrate the importance of that effect, the output is angle polished and the outer jacket immersed in matching fluid, producing a reduction in slope to 1.1° C./W. This result is significantly lower than for the etched fiber sample (3.6° C./W), but in closer agreement with that of a packaged offset splice (1.7° C./W), demonstrating the importance of the longitudinal loss profile on thermal dissipation. It confirms that the main loss in the forward direction comes from mismatches at the TFB splice, resulting in multiple, distributed loss centers. It also illustrates the importance of end preparation in managing potentially damaging reflections. Extrapolation of these measurements predicts that, at the hottest point in the device, the temperature elevation should be maintained below 50° C. at 45 W optical loss. Using passive heatsinking from 20° C. ambient, this corresponds to a safe bondline temperature of 70° C. expected from a 0.2 dB loss TFB presented with a total of 1 kW at the input of the pump legs.

In reverse, aslope of 4.8° C./W is obtained mainly due to absorption in the bundle anchoring bond, more than four times that of the forward case, and slightly higher than in the case if the etched fiber sample (3.6° C./W). The slope difference between etched fiber and TFB can be attributed to the larger NA resulting from the counter propagating excitation, leading to stronger and consequently more localized absorption in the adhesive as compared to the etched fiber sample. In both cases, the larger temperature elevation is the result of a single dominant absorption loss center located close to the fiber surface.

Figure 8:
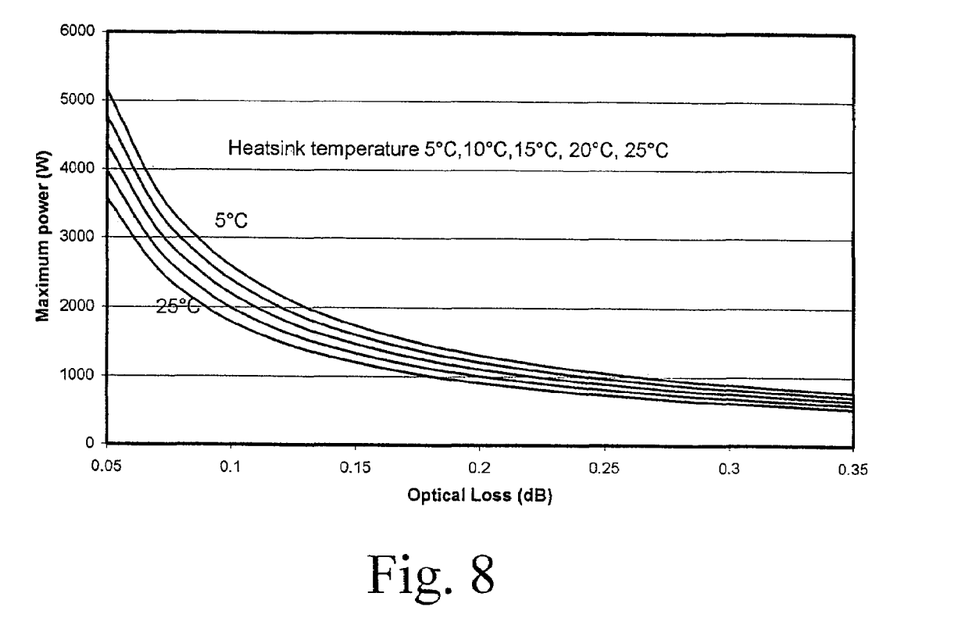
FIG. 8 is a graph showing a power handling projection at different heatsink temperatures based on a slope of 1.1° C./W using 70° C. as the maximum hot point temperature.

FIG. 8 shows power handling projections based on a maximum temperature of 70° C. using a slope of 1.1° C./W for heatsink temperatures of 5° C., 10° C., 15° C., 20° C. and 25° C.

The above results indicate that the package of the present invention produces a very satisfactory performance of the TFB component packaged therein. The temperature elevation slope of 1.1° C./W for forward propagating pump light was extrapolated to predict reliable operation at 1 kW power level using passively heatsunk 0.2 dB loss TFB when packaged in accordance with the present invention.

It should also be noted that the invention is not limited to the preferred embodiments described above, but that various modifications obvious to those skilled in the art may be made without departing from the invention and the scope of the following claims.

The invention claimed is:

1. A package for an optical fiber device capable of carrying a high power signal, which comprises:
   a) a thermally conductive packaging substrate surrounding said optical fiber device and having an entry port through which one end of the optical fiber device enters the package and an exit port through which another end of the optical fiber device exits the package;
   b) a rigid transparent adhesive bond at the entry port and at the exit port anchoring each end of the optical fiber device to the packaging substrate, said adhesive bond being made of a material having a preselected coefficient of thermal expansion (CTE); and
   c) said packaging substrate is made of a material that has a CTE in relation to the CTE of the adhesive bond, such as to compensate for any variation in volume of said adhesive bond at each end of the optical fiber device due to temperature variation, thereby limiting mechanical stress in the optical fiber device within the package.

2. A package according to claim 1, in which the packaging substrate has an absorption capacity such as to absorb essentially all optical loss emanating from the optical fiber device when it is in operation.

3. A package according to claim 1, in which the packaging substrate is made of a metal, an alloy, a composite, a ceramic, a ceramic matrix composite or a combination of two such materials in a bi-material arrangement, or a combination of these materials with a thermally conductive layer.

4. A package according to claim 3, in which the packaging substrate consists of CuW or CuMo.

5. A package according to claim 3, in which the packaging substrate consists of an alloy of aluminum and silicon.

6. A package according to claim 5, in which the packaging substrate consists of AlSi with a composition of 50% Al/50% Si by weight.

7. A package according to claim 3, in which the packaging substrate consists of a ceramic material AlN.

8. A package according to claim 3, in which the packaging substrate comprises a combination of low expansion metal selected from Invar and Kovar with high thermal conductivity inserts selected from Cu, Ag and Al.

9. A package according to claim 3, in which the combination of the materials with the thermally conductive layer has an electroplated layer or a hot dip layer or thin film layer or foil layer.

10. A package according to claim 1, in which the thermal conductivity of the packaging substrate is at least 100 w/mk (watts/meter-kelvin).

11. A package according to claim 1, in which the thermal conductivity of the packaging substrate is greater than 130 w/mk.

12. A package according to claim 1, in which the adhesive bond has a transparency of at least 80% light transmission per 1 mm thickness in operational wavelength range.

13. A package according to claim 1, in which the adhesive bond has a service temperature limit of over 130° C.

14. A package according to claim 1, in which the adhesive bond has a glass transition temperature (Tg) of above 85° C.

15. A package according to claim 1, in which the adhesive bond has essentially the same specific absorption between 800-1600 nm before and after aging of 500 hours in an 85° C./85% relative humidity environment.

16. A package according to claim 1, in which the adhesive bond is made of a UV curable bisphenol A epoxy acrylate based material and has a CTE>30 ppm/° C.

17. A package according to claim 1, in which the CTE of the adhesive bond and the CTE of the packaging substrate are selected so as to produce an effective CTE of the package close to the CTE of silica, namely $5 \times 10^{-7}$° C.

18. A package according to claim 17, in which the CTEs are in the arrangement: CTE fiber device<CTE packaging substrate<CTE adhesive bond, in order to produce an effective CTE of the package close to the CTE of silica.

19. A package according to claim 1, in which the surface finish of inner walls of the packaging substrate is in condition such as to minimize reflections and maximize effective dissipation power of the component.

20. A package according to claim 19, in which said condition is achieved by abrasion, oxidation or thin film coating of the inner walls or a combination of these procedures.

21. A package according to claim 1, which is flat and rectangular to allow efficient thermal contact when mounted on a flat surface.

22. A package according to claim 1, which is made of two elongated sections fastened to one another and wherein a grooved longitudinal channel is provided in each of said sections in which the optical fiber device is placed.

23. A package according to claim 22, in which stain relief shapes are machined into ends of the channels so as to avoid creating bend discontinuities in the fiber exiting therethrough when pulled laterally.

24. A package according to claim 1, in which the optical fiber device capable of carrying a high power signal is a coupler that combines or separates a plurality of fibers.

25. A package according to claim 24, in which said coupler is a tapered fused bundle (TFB) coupler.

26. A package according to claim 1, in which the optical fiber device capable of carrying a high power signal is a splice between two fibers.

27. A package according to claim 1, in which the optical fiber device capable of carrying a high power signal is a mode field adaptor.

28. A package according to claim 1, in which the optical fiber device capable or carrying a high power signal is a cladding light stripper.

29. A package according to claim 1, in which the optical fiber device capable of carrying a high power signal is a Bragg grating.

* * * * *